United States Patent [19]
Ho et al.

[11] Patent Number: 5,743,743
[45] Date of Patent: Apr. 28, 1998

[54] LEARNING METHOD AND SYSTEM THAT RESTRICTS ENTERTAINMENT

[76] Inventors: Chi Fai Ho, 4816 Cabello Ct., Union City, Calif. 94587; Peter P. Tong, 1807 Limetree La., Mountain View, Calif. 94040

[21] Appl. No.: 707,189

[22] Filed: Sep. 3, 1996

[51] Int. Cl.$^6$ .............................. G02B 19/00; G09B 7/00
[52] U.S. Cl. .............................. 434/236; 434/323
[58] Field of Search .................... 434/236, 322, 434/323; 380/3, 4, 5; 395/287, 726, 848, 856; 273/429, 454, 460

[56] References Cited

U.S. PATENT DOCUMENTS 5,168,372 12/1992 Sweetser ................................ 348/5.5
5,434,562 7/1995 Reardon ............................... 340/825.34

FOREIGN PATENT DOCUMENTS

08196741 A  8/1996  Japan.

*Primary Examiner*—Richard J. Apley
*Assistant Examiner*—John Edmund Rovnak
*Attorney, Agent, or Firm*—Peter P. Tong

[57] ABSTRACT

Method and system to help a student to focus on study materials on a computer by restricting the student from enjoying entertainment materials on the computer. The study materials are presented through a study program, and the entertainment materials are presented through an entertainment program. The entertainment program needs a device to entertain. The device can be a speaker or a position-pointing device, such as a mouse. The computer includes an access filter, which separates the programs from the device. The access filter can be modified to restrict coupling between the device and the entertainment program, but simultaneously allow coupling between the device and the study program. The restriction in the access filter can be removed under a predetermined condition, such as the amount of time the student has been working on the study materials, the student's performance in the study materials, and the time of day.

27 Claims, 13 Drawing Sheets

250

Modify the Access Filter to Restrict Entertainment Programs but to Allow Study Programs to Couple to a Device    ~ 252

Remove Restriction under a Predetermined Condition    ~ 256

250

Modify the Access Filter
to Restrict Entertainment
Programs but to              ∼ 252
Allow Study Programs
to Couple to a Device Remove Restriction
under a                      ∼ 256
Predetermined Condition Virtual Driver Changes
the Original Program-level
Identifier of the Original Driver ~ 452
to a Different Identifier Virtual Driver Adopts the
Original Program-level Identifier ~ 454
as its Program-level Identifier Program Invoking the
Program-level Identifier ~ 456
Invokes the Virtual Driver Virtual Driver Assumes
the Program-level Identifier ~ 462
of the Device Driver

▼

The Underlying-system-
level Codes Invoke the ~ 466
Virtual Driver

Enter Study Program
    Names into the Access      ~ 502
      Storage Medium
            │
            ▼
    Compare the Name of
      a Program with           ~ 504
     the Entered Names
            │
            ▼
    Treat the Program as a
      Study Program if         ~ 506
      There is a Match
```

Figure 8

LEARNING METHOD AND SYSTEM THAT RESTRICTS ENTERTAINMENT

BACKGROUND OF THE INVENTION

The present invention relates generally to education, and more particularly to helping a student to focus on study materials on a computer by restricting the student from enjoying entertainment materials on the computer.

Both at home and in schools, the computer is gradually becoming a major medium for education. There are many reasons for this trend. One is the tremendous reduction in the price of a computer, causing it to permeate into almost every household. Also, the computation and memory capacity of even the inexpensive computer are sufficient for many useful operations, such as word processing.

Another reason for the proliferation of the computer is that one can learn through the computer numerous subjects, such as basic mathematics, Scholastic Achievement Test, evidence in law, and even ways to fix a faucet. Such programs can be installed in one's personal computer, or can be accessed from a network, such as the word-wide-web ("Web").

In addition to using the computer to learn, many of us have been using it to play. Gradually the computer is becoming a major medium for entertainment. Hours have been spent on playing Solitaire or Minesweeper because they are usually sold with the operating system in the computer. We can also access many free entertainment materials from the Web. If one is willing to pay, there are many other affordable and entertaining programs we can buy. Moreover, with an appropriate circuit board, the computer can access the television signal. This allows us to work in one window, while watch a football game in another window on the same screen.

Although the entertainment materials easily accessible on the computer can be quite enjoyable, they can be very distracting when we are using the same computer to work on study materials. This is especially true when the study materials become boring, or when the study materials are quite complicated, and require significant amount of time to understand. The problem is even more acute among the young computer users. Many teenagers are spending more and more of their time surfing the Web. Though accessing the Web is gradually becoming relatively inexpensive, it can easily distract them from working on study materials in the computer. This problem of distraction will become even more severe if the computer monitor becomes the de facto television monitor. When that time comes, the temptation to be sidetracked from study materials in the computer is going to become very high. It is hard to concentrate when through one touch on the keyboard, the student would be able to watch his favorite television show on the same monitor.

It should be obvious from the foregoing that there is still a need for a computer-aided-educational system and method that can automatically and temporarily restrict the student from enjoying entertainment materials while allowing her to work on study materials.

SUMMARY OF THE INVENTION

The invented computer-aided-educational method and system help a student to focus on study materials on the computer. If the student should be working on the study materials, the system restricts him from enjoying entertainment materials on the computer. With such an invention, the student is not distracted by entertainment materials on the computer, when he should be working on the study materials. Even if he wants to play, he has to finish studying first.

In the present invention, the entertainment materials are presented through an entertainment program, and the study materials are presented through a study program.

In one embodiment, the invented system includes an access filter between the programs and a device. The entertainment program needs the device to entertain. A controller controls the access filter to automatically restrict the coupling between the device and the entertainment program, but simultaneously allow the coupling between the device and the study program.

Different entertainment materials typically require different types of devices to entertain. Some examples of devices required by entertainment materials include speakers, a position-pointing device such as a joy-stick, an output device, a storage medium and a circuit board. The circuit board can be used to couple to video-signals, audio-signals or other digital or analog signals. The video-signals can be television signals.

In one embodiment, the access filter includes a device driver.

Under a predetermined condition, the controller removes the restriction automatically to allow the device to couple to the entertainment program. This can be done through a token system. Under the predetermined condition, the student is given a token, which the student can use to remove the restriction. With the restriction removed, the student can enjoy the entertainment materials.

The predetermined condition can be based on one or more factors, such as the amount of time the student has been working on the study materials, the student's performance in the study materials, and the time of day.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIGS. 7A–C show another way to modify the access filter by including a virtual driver in addition to a device driver in the present invention.

FIG. 8 describes one set of steps enabling the controller to determine whether a program is a study program or an entertainment program in the present invention.

Same numerals in FIGS. 1–10 are assigned to similar elements in all the figures. Embodiments of the invention are discussed below with reference to FIGS. 1–10. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
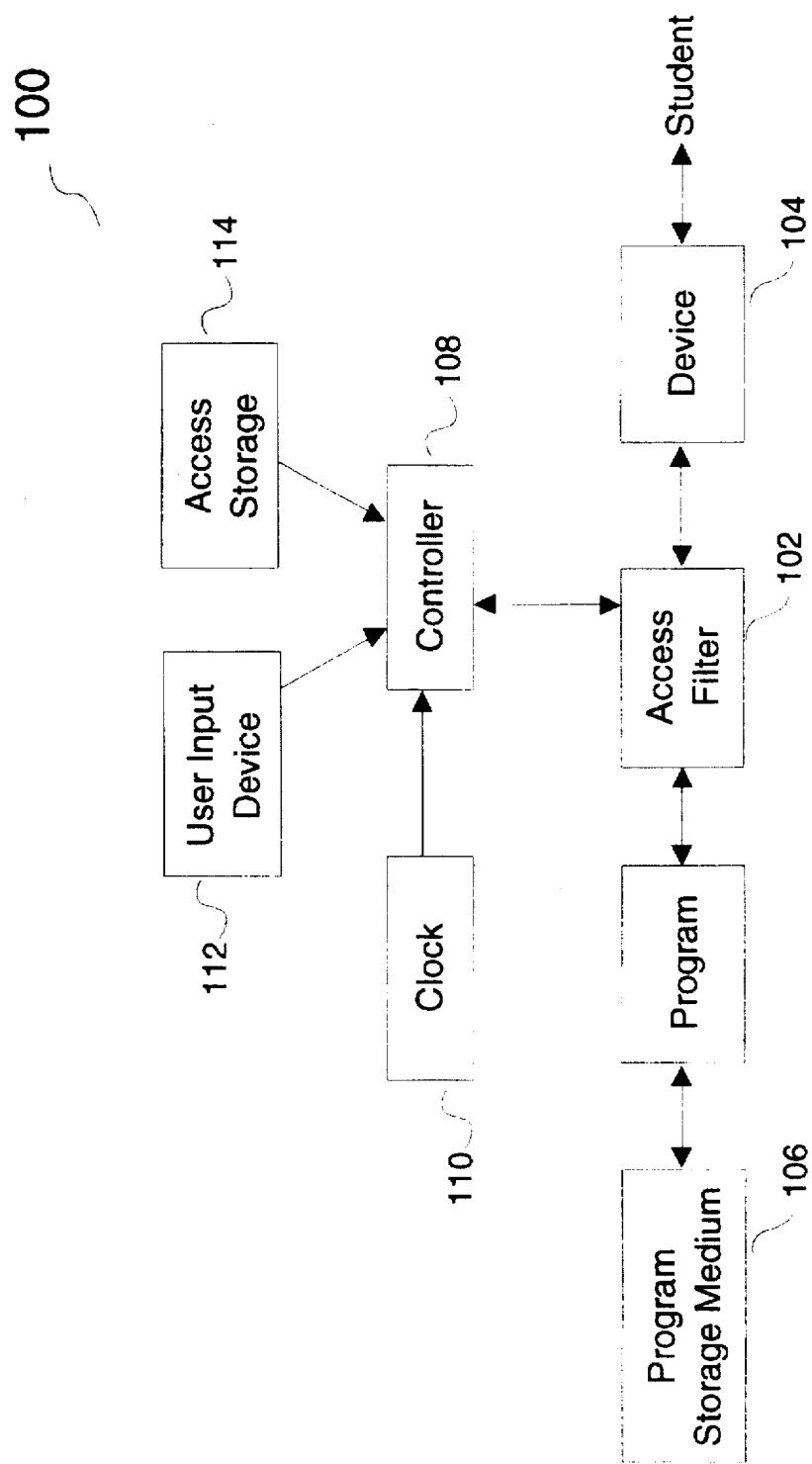
FIG. 1 illustrates one embodiment of the present invention.

FIG. 1 shows one embodiment of a computer-aided-educational system 100 of the present invention. It includes an access filter 102 between a device 104 and a program, which can be a study program or an entertainment program. The program, if not executing, can be stored in a program storage medium 106, which stores programs and the materials needed by the programs, such as a study program with its study materials.

Different types of programs typically require different types of devices to fulfill its purpose. For example, one type of entertainment programs, such as Solitaire, requires a student to manipulate a position-pointing device in order for the student to enjoy it. The access filter 102 can be modified by a controller 108 to restrict different programs from coupling to the device 104. The controller 108 is connected to a number of elements, such as a clock 110, a user-input device 112 and an access storage medium 114. The elements supply inputs to the controller 108, which modifies the access filter 102 to restrict the one or more entertainment programs from coupling to the device 104. During the restriction, the access filter simultaneously allows the one or more study programs to couple to the device 104.

In this disclosure, for one embodiment, study materials are materials whose main purpose is to convey knowledge to, or to train the student. Entertainment materials are amusing materials whose main purpose is not to convey knowledge, nor to train. In another embodiment, the previously defined entertainment materials might become study materials, and the previously-defined study materials might become entertainment materials. In this embodiment, study materials are determined by, for example, an instructor, a guardian, a system operator or the student himself, as materials the student should learn. Any other materials not predetermined to be learnt will be considered as entertainment materials. In a further embodiment, entertainment materials are materials determined by, for example, the instructor, the guardian, the system operator or the student himself. Any other materials not predetermined to be for entertainment will be considered as study materials. In yet another embodiment, study materials cover materials whose main purpose is to convey knowledge, and entertainment materials cover materials whose main purpose is not to convey knowledge.

Figure 2A:
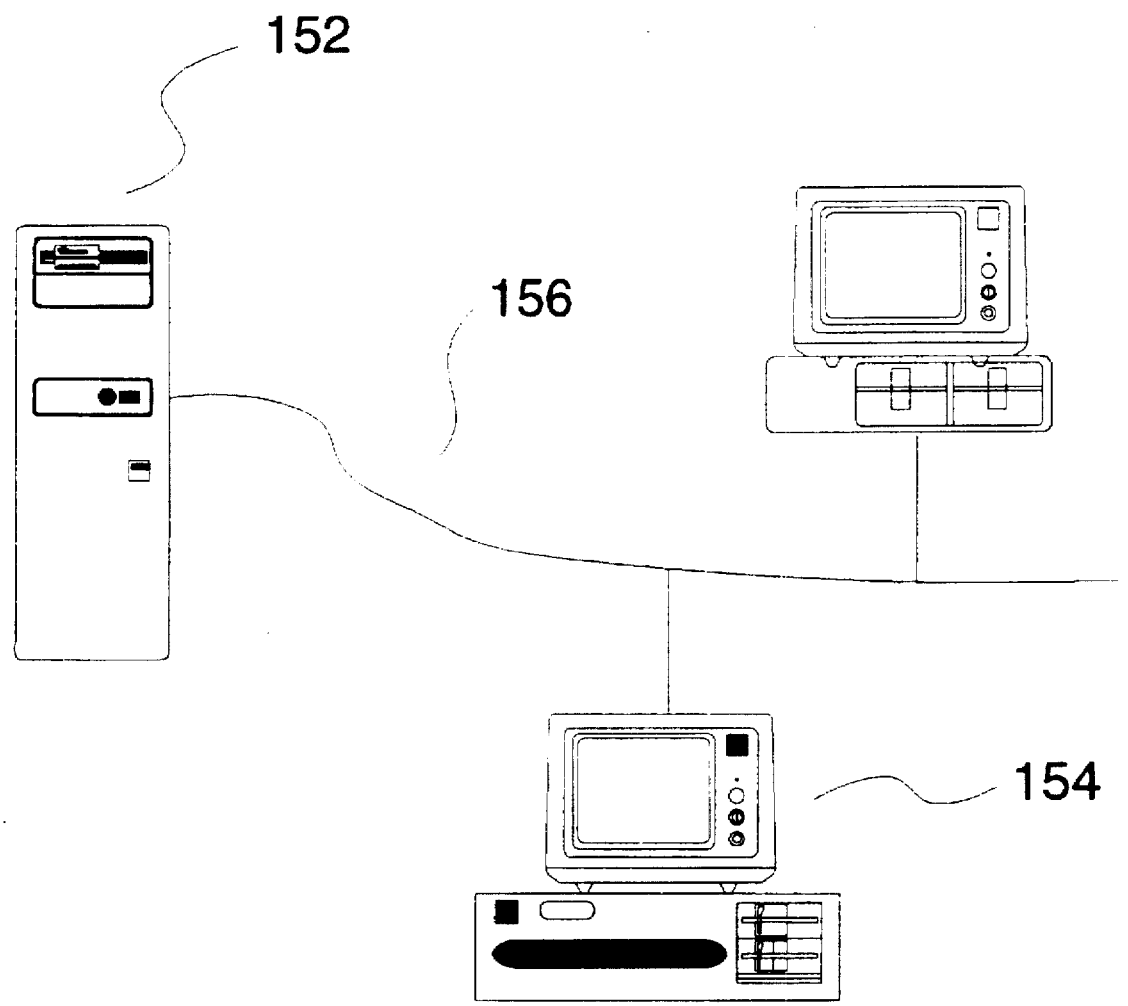
FIGS. 2A–B show one embodiment of a system implementing the present invention.

FIG. 2A shows one embodiment of a system 150 implementing the present invention, preferably in software and hardware. The system 150 includes a server computer 152 and a number of client computers, such as 154, which can be a personal computer. Each client computer communicates to the server computer 152 through a dedicated communication link, or a computer network 156.

Figure 2B:
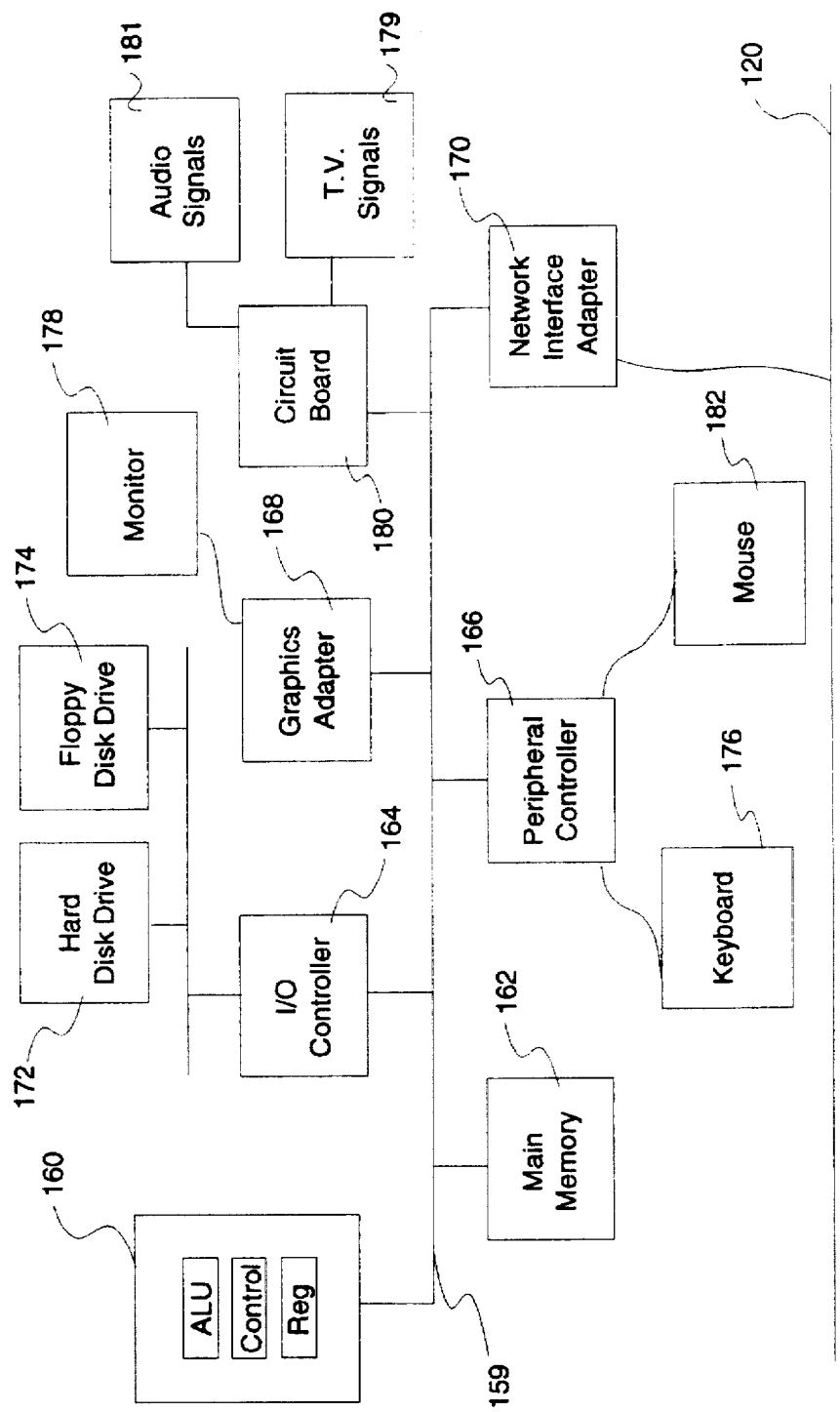

FIG. 2B shows one embodiment of a client computer 154. It typically includes a bus 159 connecting a number of components, such as a processing unit 160, a main memory 162, an I/O controller 164, a peripheral controller 166, a graphics adapter 168, a circuit board 180 and a network interface adapter 170. The I/O controller 164 is connected to components, such as a harddisk drive 172 and a floppy disk drive 174. The peripheral controller 166 can be connected to one or more peripheral components, such as a keyboard 176 and a mouse 182. The graphics adapter 168 can be connected to a monitor 178. The circuit board 180 can be coupled to audio signals 181 or television signals 179; and the network interface adapter 170 can be connected to the network 120, which can be the Internet, an intranet, the Web or other forms of networks. The processing unit 160 can be an application specific chip.

Another embodiment of the client computer 154 includes the bus 159 connecting a number of components, such as the processing unit 160, the peripheral controller 166, the network interface adapter 170, and the circuit board 180 coupling to audio signals 181 or television signals 179. In a further embodiment, the client computer 154 includes the bus 159 connecting a number of components, such as the processing unit 160, the circuit board 180 coupled to television signals 179. In yet another embodiment, the client computer 154 includes the bus 159 connecting a number of components, such as the processing unit 160, the peripheral controller 166, the main memory 162, the graphics adapter 168 and either the network interface adapter 170 or the I/O controller, which can be connected to a storage device, such as the harddisk drive 172.

Different components of the present invention can be in different elements shown in FIGS. 2A–B. For example, the device 104 and the user-input device 112 can be in a client computer, with all the other components in the server computer 152. In another embodiment, the access filter 102 and the program storage medium 106 are also in a client computer. Different components can be in different elements. Nonetheless, there is no restriction preventing all the components shown in FIG. 1 to reside in one element, such as a client computer.

A number of operations, steps or components in the present invention can be implemented by software programs, which are executed, for example, by the processing unit 160 or an operating system in the system 100. In yet another embodiment, the software can be stored in a storage medium, which can be, for example, the main memory 162 or a CD read-only-memory.

The present invention is applicable to teach study materials that can be taught by a computer. The teaching period may last one semester or a year, or just one class session. The materials may cover inter-disciplinary areas, such as electrical engineering and thermodynamics, or computer networking and programming techniques. The materials may just be for training a field engineer on a new product. In the following, mathematics is the subject used to illustrate study materials in the present invention.

In one embodiment, the subject is divided into major-topics, with each major-topic subdivided into minor-topics, and with each minor-topic further subdivided into line-items. Each line-item typically covers one well-defined area in the subject. In another embodiment, the subject is further divided into more levels below the line-items; and in a third embodiment, the subject is just divided into line-items.

As an example of line-items, if the major-topic is high school algebra, then it can be divided into the following line-items, with bracketed terms served as comments:
High School Algebra (the major-topic)
  (Minor-topics under the major-topic)
  Decimal Numbers
  Polynomials
  Linear Equations Quadratic Equations
Integers
  (Line-items under the minor-topic of integers)
  Addition & Subtraction (Difficulty level 1)
  Multiplication (Difficulty level 2)
  Division (Difficulty level 2)
  Prime Numbers (Difficulty level 3)
  Factorization (Difficulty level 3)
  Common Divisor (Difficulty level 4)
Fractions
  (Line-items under the minor-topic of fractions)
  Addition & Subtraction (+/−) with Common Denominator (Difficulty level 3)
  +/− with Integers (Difficulty level 4)
  +/− without Common Denominator (Difficulty level 5)
  Multiplication and Divisions (*,/) with Integers (Difficulty level 5)
  */ with fraction (Difficulty level 6)
  Compound Fractions (Difficulty level 6)
  Fraction Reduction (Difficulty level 7)
  Ratios and Proportions (Difficulty level 7)

Another example with the minor topic being differential calculus is as follows:
Calculus (major topic)
  Differential calculus (minor topic)
    Fractions (Difficulty level 1)
    Polynomials (Difficulty level 1)
    Exponential Functions (Difficulty level 1)
    Differentiation (Difficulty level 2)
    Differentiate a sum (Difficulty level 3)
    Differentiate a product (Difficulty level 3)
    Differentiate a quotient (Difficulty level 4)

In one embodiment, each line-item has a difficulty level. The bracketed difficulty level next to each line-item in the above example indicates how difficult one line-item is relative to other line-items in the subject, or how significant one is relative to another. A line-item with a low difficulty level is a relatively easy line-item or a relatively less important line-item. Typically, a student learning a subject starts from learning line-items at the lowest difficulty level.

The lists of items in the above examples are generated based on expert knowledge on the subject of mathematics. With the proper instruction, such as through reading the present specification, the method to generate such lists with the difficulty levels should be obvious to experts in the subject. The more knowledgeable the expert, the more complete the sets of items.

In one embodiment, each line-item is represented by a line-item root, which includes the line item and its root. In the above example, the root of a line-item includes its subject, its major topic and minor topic.

In one embodiment, once the study program is selected, such as by the student, the program starts the learning process by selecting a line-item with the lowest difficulty level. If there are a number of those lowest level line-items, one of them is randomly selected. The study program then retrieves the study materials for that line-item from the program storage medium 106 so as to present the study materials to the student. After presentation, the study program selects another line-item with the lowest difficulty level among all the un-selected line-items, and the process repeats. For this embodiment, each line-item also includes a mode attribute, which is changed from the un-selected to the selected mode after the study materials for that line-item has been selected to be worked on by the student.

To select a set of study materials from the program storage medium 106, the study program, based on the line-item root, retrieves the corresponding study materials from the storage medium 106. Typically, there are a number of sets of study materials in the storage medium 106, and they can be in the following format:
(line-item root, mode, study materials)

The following serves as examples of study materials for differentiating polynomial:

First, the system teaches the approach to generate derivatives based on the basic principle in differentiation, such as:

$$df(x)/dx = \lim_{h \to 0}((f(x+h)-f(x))/h)$$

Then the system teaches the generalized equation, such as:

$$((d\Sigma a_i x^i)/dx) = (\Sigma i * a_i x^{i-1})$$

Finally, the system teaches the importance of and the way to find optima and minima by solving the following equation:

$$((d\Sigma a_i x^i)/dx) = 0$$

Based on the line-item root, and with one set of study materials per line-item, the study program retrieves from the program storage medium 106, the corresponding set of study materials. Creating study materials on a subject should be obvious to experts in the subject, and will not be further discussed in this application.

The study program then presents the study materials to the student. The study materials can be a document with no questions, arranged as a list of screens. Typically the monitor 178 presents the study materials to the student, who can go from one screen to another with the keyboard 176, or the mouse 182. In another embodiment, the study materials are broadcast through a radio.

In another embodiment, the study materials only have questions. Typically, students gain a better understanding on a subject through actively working on questions than through passively reading study materials. In one embodiment, each question is embedded in a question entry, which is of the following format:
(line-item root, mode, question-body, answer).

The term "question-body" describes the body of a question. The following serves as an example:
Subject: Mathematics.
  Major-topic: High School Algebra.
  Minor-topic: Fraction.
  Line-item: +/− with common denominator
  Mode: Un-selected

| Answer | Question-body |
|---|---|
| 28/37 | What is the sum of 2/37, 3/37, 8/37 and 15/37? |
| −2/43 | 17/43 − 25/43 + 6/43 = ? |

The study program selects from the program storage medium 106 the study materials that have a set of questions with the same line-item root to be presented to the student.

An example of study materials with questions are the line-item of differentiating exponential functions. A number of questions are generated, including the question on expanding an exponential function based on Taylor expansion, the question on differentiating the Taylor-expanded exponential function, whose answer is the original Taylor-expanded exponential function, and the question on differentiating the exponential function, whose answer is the exponential function.

In another embodiment, the study materials include study materials with questions and study materials without questions.

Note that the formats of the study materials may change as the student progresses. The student can learn one line-item based on questions, and another based on study materials with no questions. As an example, for differential calculus, of the different line-items, all of them can be learnt through either study materials with or without questions, except for the line-item of differentiation, which is typically learnt without questions. That study-materials cover the general differentiation concept, such as the following:

$$df(x)/dx = \lim_{h \to 0}((f(x+h)-f(x))/h)$$

Figure 3:
FIG. 3 shows a set of steps to implement one embodiment of the present invention.

FIG. 3 shows a set 250 of steps to implement one embodiment of the present invention. First the controller 108 modifies (step 252) the access filter 102 to restrict the device 104 from coupling to an entertainment program, but simultaneously allow the device 104 to couple to a study program. Then under one or more predetermined condition, the controller 108 removes (step 256) the restriction automatically to also allow the device to couple to the entertainment program. Another embodiment also includes the step of presenting study materials to the student. In this invention, a program and a device are considered coupled when the program is using the device, or the device is using the program.

Figure 4:
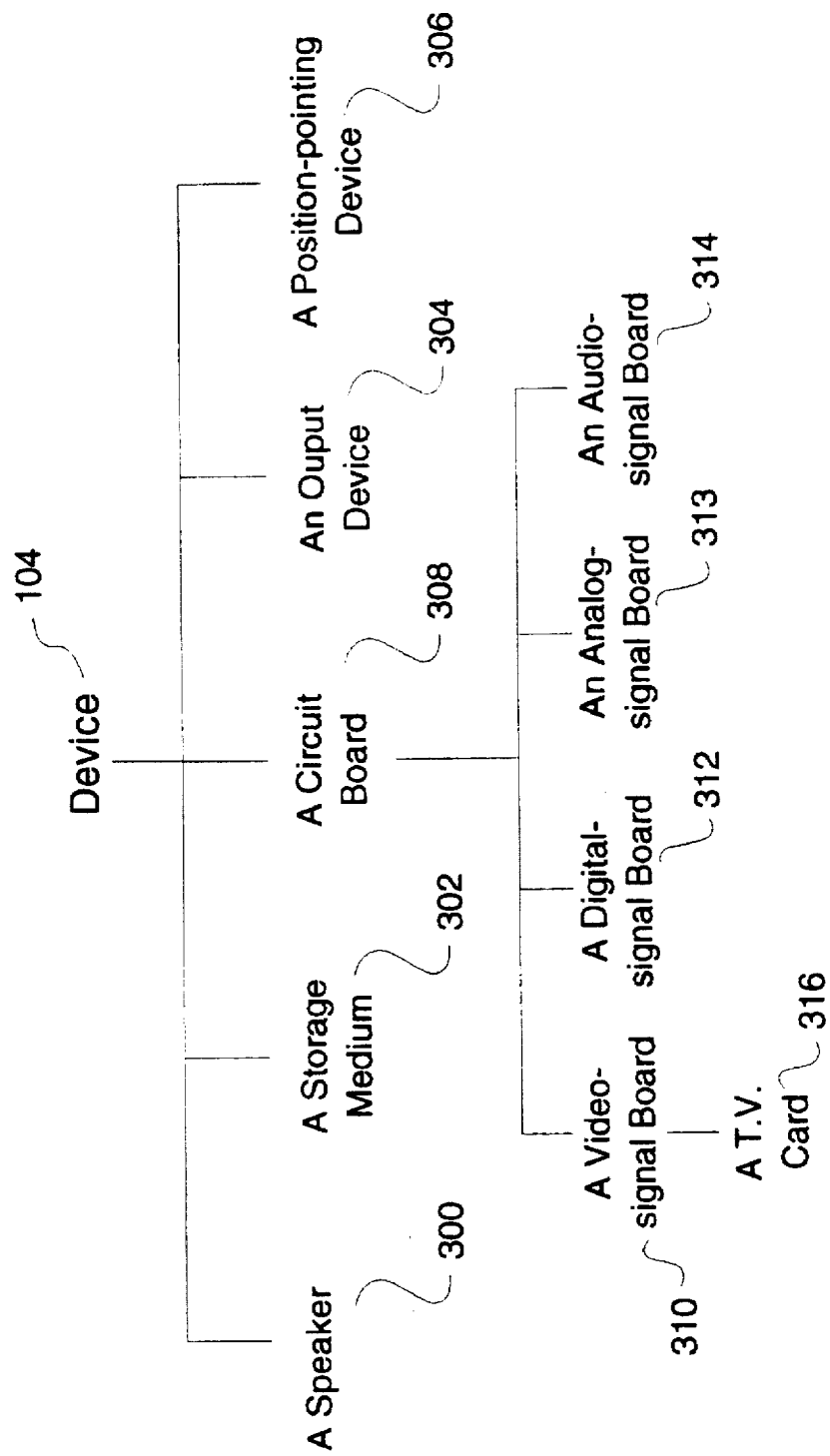
FIG. 4 shows examples of different devices required by different types of entertainment materials in the present invention.

Different types of entertainment materials may require different devices, or one type of entertainment materials may require numerous devices to entertain, or to fulfill its entertainment purpose. FIG. 4 shows examples of different devices applicable in the present invention, including a speaker 300, a position-pointing device 306, and an output device 304, which can be the monitor 178. Many entertainment materials need the speaker 300 to enhance its entertaining effects, and require the student to manipulate the position-pointing device 306 to interact with features in the entertainment materials.

There are entertainment programs that require a storage medium 302 to store information, such as pictorial data.

A number of types of entertainment materials need different types of circuit boards 308 to entertain, such as a video-signal board 310, a digital-signal board 312, an analog-signal board 313 or an audio-signal board 314. The audio-signal board 314 can be a sound card or a voice card. The video-signal board 310 may be the board to access the television signals. With the television board, the monitor 178 in the system 100 can broadcast a television show. As the student works on study materials, the student can also access television shows on the monitor. Similarly, the audio-signal board allows the system 100 to broadcast radio shows or to play music.

The digital-signal board 312 and the analog-signal board 313 are the circuit boards for digital signal and analog signal respectively. These signals may be transmitted, such as wirelessly through electromagnetic wave, or through cables to the system 100.

If entertainment materials require one or more of the above devices to entertain, then without such one or more devices, the materials are not quite entertaining, and have not fulfilled its entertainment purpose. Thus, if the controller 108 restricts the entertainment program presenting the entertainment materials to couple to those one or more devices, the student is restricted from enjoying the entertainment materials.

There are many methods for the controller 108 to modify the access filter 102 to restrict coupling between a device and an entertainment program. In one embodiment, the access filter 102 includes a device driver, also known as a driver, which typically is a software program for handling the device. The controller 108 can replace or modify that access filter to restrict coupling between the device and the entertainment program.

A typical driver provides the necessary access service to its corresponding device, with the service depending on the hardware and software specifications of the system. The typical driver has a header, which includes information such as the name of the driver, the name of the device accessed by the driver, a number of entry points, and attributes. Entry points are locations entered by a program to perform a number of operations, such as opening the driver, closing the driver, interrupting the driver and controlling the behavior of the driver. Attributes include the size of the driver binary or executable file. Different devices use different types of drivers, with some being pre-installed drivers and others being user-installed or non-pre-installed drivers.

A pre-installed driver comes with the operating system. Input devices, such as mice, keyboards and joy-sticks, are typically handled by pre-installed drivers. When a program needs to couple to such a device, the operating system accesses the appropriate entry point of the corresponding pre-installed driver.

Figure 5:
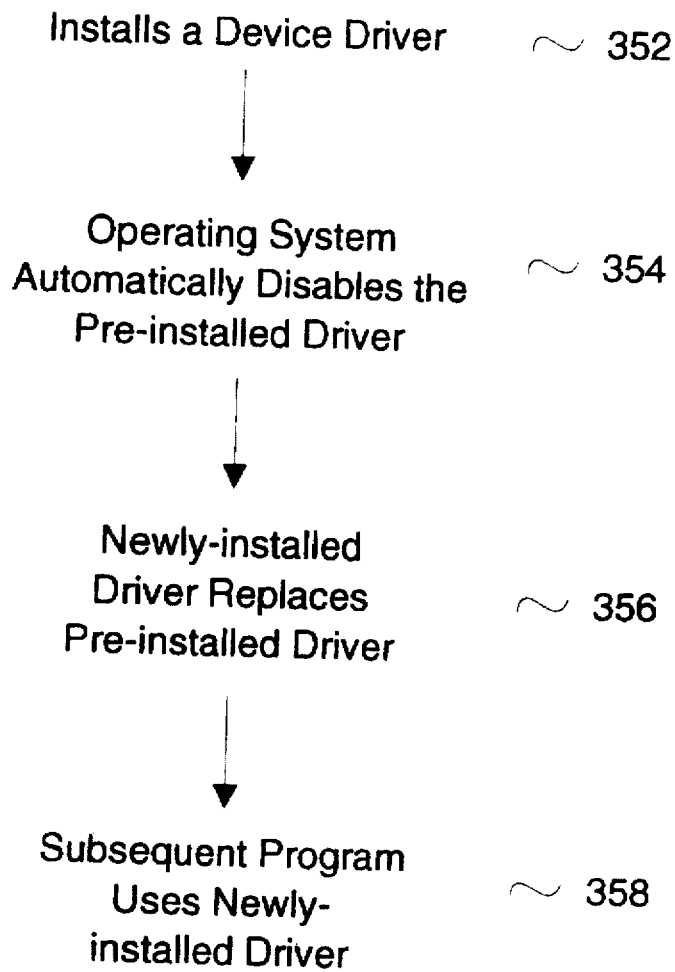
FIG. 5 shows one set of steps replacing a pre-installed driver to restrict coupling in the present invention.

FIG. 5 shows one set of steps 350 replacing a pre-installed driver to restrict coupling between an entertainment program and the device needed by the program to entertain. First, a new device driver is installed (step 352). This can be done by a user, or automatically by a controller under certain predetermined condition. The new driver indicates to the operating system the device it intends to handle in its header. A number of operating systems automatically disable (step 354) the pre-installed driver in view of any newly-installed driver for the same device. Thus the newly-installed driver replaces (step 356) the pre-installed driver in handling the device. After the installation of the new driver, subsequent programs coupling to the device use (step 358) the newly-installed driver, instead of the pre-installed driver. Those programs will not invoke the codes of the pre-installed driver, but will automatically invoke the codes of the newly-installed driver. To restrict coupling between the device and the entertainment program, the newly-installed driver does not couple to the corresponding device.

There are many drivers that are not pre-installed. Typically, those drivers do not come with the operating system. Instead, they come with their corresponding devices. They may be installed by a user. For example, the user-installed drivers can couple to output devices such as monitors and speakers, or non-system devices like sound cards, network cards and TV cards.

Figure 6:
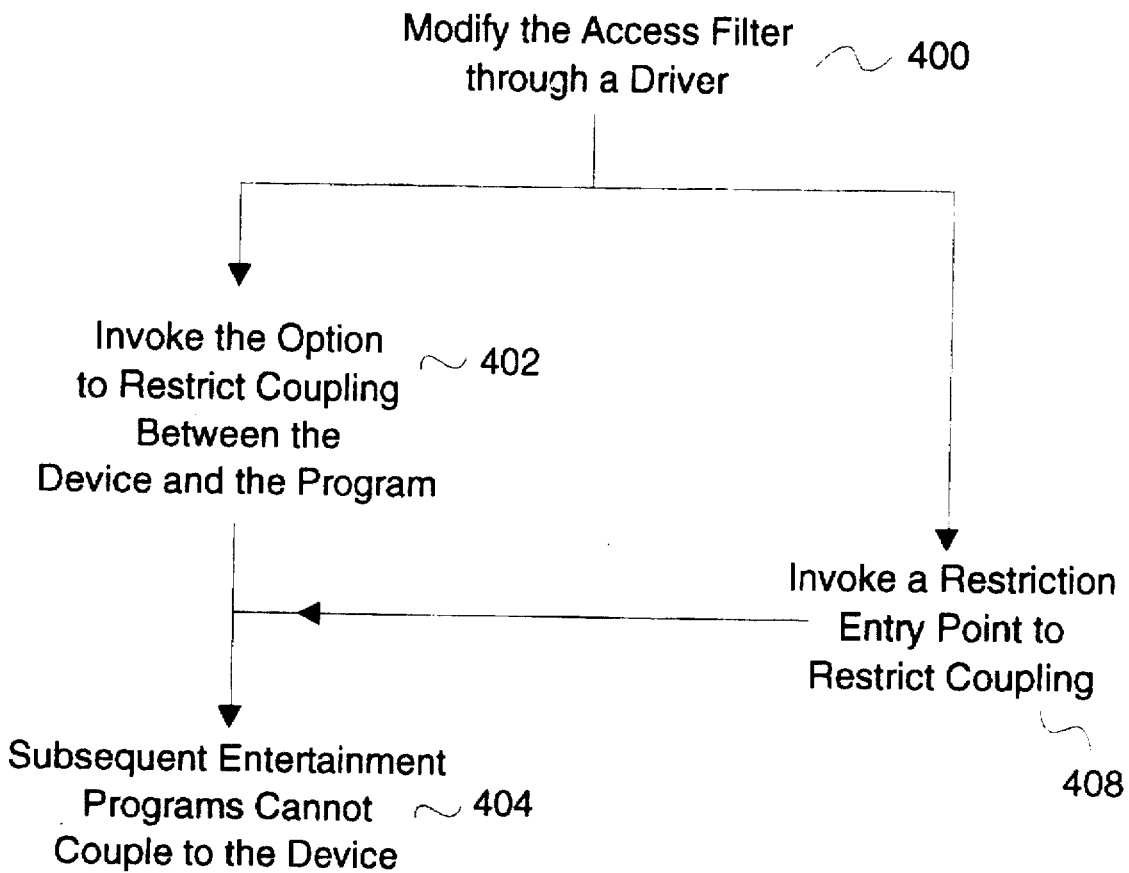
FIG. 6 shows different methods to modify the access filter in the present invention.

FIG. 6 shows two different ways to modify (step 400) the access filter based on a non-pre-installed or a user-installed driver. If the set of codes controlling the behavior of the driver includes the option to restrict coupling, then the controller 108 can restrict coupling between the device and the program (step 402) through invoking that option at the behavior-controlling entry point. After the restriction, subsequent entertainment programs cannot couple to (step 404) the corresponding device, until the controller, under a pre-determined condition, removes the restriction.

Another way to modify the access filter is for a type of driver with a restriction-entry point. That entry point, if appropriately invoked (step 408), leads to coupling restriction or to removing the restriction. For example, the piece of codes in the access filter can simply modify a flag by the appropriate passing-argument through the restriction-entry point. If the controller 108 wants to restrict coupling, the controller can command the driver to change the flag accordingly—if the flag is one, the coupling is restricted; if the flag is zero, coupling is allowed. Then, when a program tries to couple to the corresponding device, the driver checks the flag. Only when the flag is one, the corresponding device can be coupled.

Figure 7A:
Figure 7A:
Figure 7C:
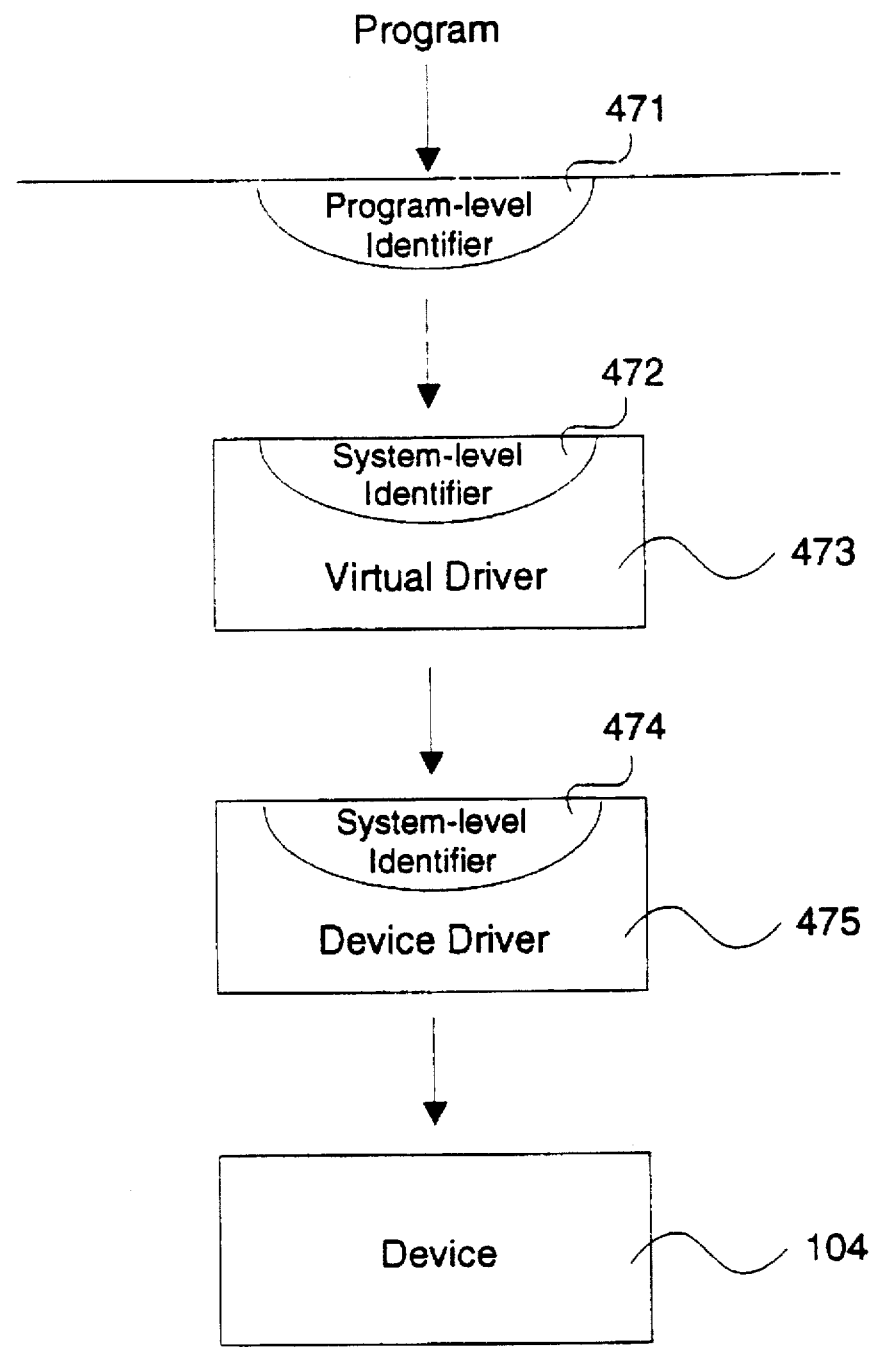

FIGS. 7A–C show another way to modify the access filter by including a virtual driver in addition to a device driver. FIGS. 7A and 7B show two different methods, with FIG. 7C generally illustrating both of them. This embodiment is applicable to both pre-installed drivers and non-pre-installed drivers.

The device driver 475 for such an embodiment includes at least two identifiers—a program-level identifier 471 and a system-level identifier 474. An example of a program-level identifier is a character string, and an example of a system-level identifier is a number that identifies the driver 104. Typically, a program accesses such a device 476 through invoking the program-level identifier 471. When that happens, a set of underlying-system-level codes in the system 100 converts that identifier to the system-level identifier 474, and executes the driver codes corresponding to that system-level identifier 474 to couple to the device 104.

The virtual driver in such an embodiment also includes at least two identifiers—its program-level identifier and its system-level identifier 472.

In one embodiment as shown in FIG. 7A, the virtual driver 473, if included in the access filter, changes (step 452) the program-level identifier 471 of the device driver 475 to a temporary identifier, and adopts (step 454) the original program-level identifier 471 of the device driver 475 to be its program-level identifier. With the virtual driver in place, when a program intending to couple to the device 104 invokes its corresponding driver 475 through its program-level identifier 471, the virtual driver 473 is invoked instead (step 456).

In another embodiment, as shown in FIG. 7B, if the virtual driver 473 is included in the access filter, the virtual driver 473 assumes (step 462) the program-level identifier 471 of the device driver 475 to be its program-level identifier. With the virtual driver in place, when a program intending to couple to the device 104 invokes its corresponding driver 475 through its program-level identifier 471, the underlying-system-level codes automatically invoke the virtual driver 473 (step 466).

In both of the above embodiments, to invoke the virtual driver, the underlying-system-level codes convert the program-level identifier of the virtual driver to its system-level identifier, and execute the virtual driver codes. That set of virtual driver codes does not have to couple to the device. However, if the decision is to couple to the device, the virtual driver codes invoke the corresponding device driver through the system-level identifier of that device driver.

In one embodiment, the virtual driver can be embedded in the underlying-system-level codes.

In all of the above approaches that modify the access filter through a driver, the codes in those drivers can be written to provide the controller 108 an option to restrict or not to restrict coupling. For example, the virtual driver codes have the option to couple to or not to couple to the device. It would be up to the controller 108 to select which path to take. The method to implement such modifications should be obvious to those skilled in the art, and will not be further described in this disclosure.

In one embodiment, the method 250 further includes the step of determining whether a program is an entertainment program or a study program before the step of modifying. FIG. 8 shows one embodiment 500 enabling the controller 108 to determine whether a program is for entertainment or studying. As an example, the controller 108 takes over the screen, and is responsible for the invocation of programs. Invoking any program has to go through the screen launched by the controller 108. Thus, the controller 108 is aware of the identifier of a program initiated by the student. In this embodiment, the student, guardian, instructor or system operator can enter (step 502) the identifiers or the names of study programs into the access storage medium 114, through the user-input device 112. Access to the medium 114 can be controlled through a password. When a program is invoked, which, for example, can be through entering the program identifier or clicking the program icon, the controller 108 compares (step 504) the program identifier with the study program identifiers stored in the access storage medium 114. If there is a match, the controller treats (step 506) the program as a study program.

Figure 9:
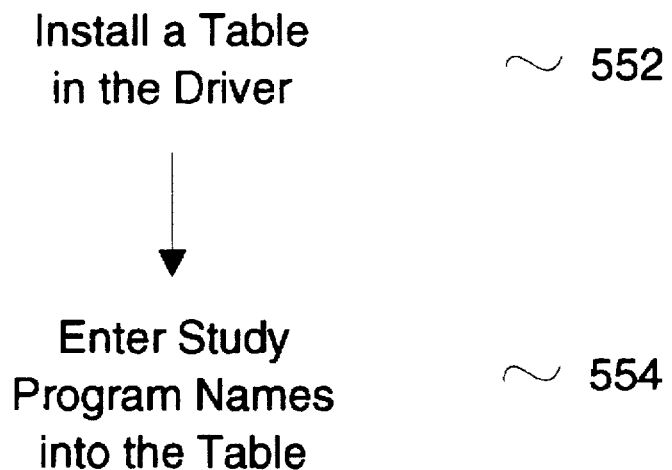
FIG. 9 shows another embodiment enabling the controller to determine whether a program is a study program or an entertainment program in the present invention.

FIG. 9 describes another set 550 of steps enabling the controller 108 to determine whether a program is a study program or an entertainment program. It is similar to the embodiment shown in FIG. 8 except it depends on a device driver. In a number of the above embodiments, a driver is either replaced or modified. As a driver is modified by the controller, a table is installed in the driver (step 552). Identifiers of study programs are entered (step 554) into the table. If a program identifier is not one of the entries in the table, that program is considered to be an entertainment program. In one embodiment, to change entries in the table, one has to enter a password into the system 100. Later, when a program tries to couple to a device, the driver compares the identifier of the program with the identifiers in the table. If the program identifier is not listed in the table, the driver will treat the program as an entertainment program.

The embodiments shown in FIGS. 8–9 can be modified to record identifiers of entertainment programs instead of identifiers of study programs. Then, for the embodiment shown in FIG. 9, the identifiers of entertainment programs that require certain drivers to entertain will be listed in the tables of those drivers.

In another embodiment, a study program or an entertainment program has its own designator, which can be set, such as through the credential of the program. Each program has a storage credential, an executing credential, or both a storage and an executing credentials. In one embodiment, the credential can be a table of different credentials. The student, guardian, instructor or system operator, through the user-input device 112, can change either the storage credential, the executing credential or both credentials of each of the entertainment programs to an entertainment credential. As in the above embodiment, one may change the credentials if one has the proper permission, such as a password, to do so. When a program is invoked, in one embodiment, before the program executes, the controller or the underlying-system-level codes check the storage credential of the program; in another embodiment, when the program is executing, the access filter checks the executing credential of the program. Either way, the system 100 knows whether the program is for entertaining or for studying, and acts accordingly.

In the above embodiments, the controller's action is determined through the identity of the program. In another embodiment, determination is through the identity of the student. Each program in storage has its attributes. In one embodiment, if the attributes of a program include the name of the student, that program is treated as a study program. If the attributes do not, that program is treated as an entertainment program. This embodiment requires the student to enter his name into the system when the student starts using the system 100. The guardian, instructor, student or system operator, through a password, can modify the attributes of a program to add the student's name. When a program is invoked, before the program executes, the controller or the underlying-system-level codes check its attributes to see if the student's name is included, and acts accordingly.

Figure 10:
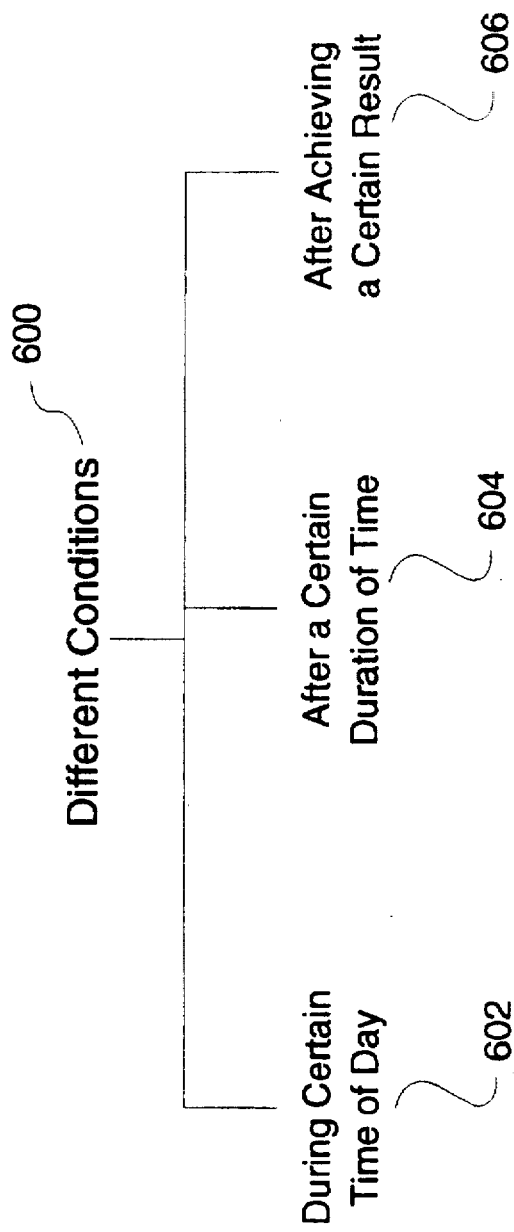
FIG. 10 depicts a number of conditions to determine when to remove coupling restriction in the present invention.

In one embodiment, the controller 108 also determines when to restrict coupling, and when to remove the restriction. FIG. 10 depicts examples of a number of conditions 160 to determine when to remove the restriction. The reverse of those conditions sets the situations to have restriction. These conditions can be stored in the access storage medium 114. The controller 108 can retrieve them automatically and to remove restriction according to those conditions.

One condition 602 is the time of day. There might be certain time the parents prefer the student to work on the study materials. The controller 108 can, for example, monitor the clock 110 in the system 100, and activate the restriction only during those time of day. In fact, the clock signal can be accessed through the system 100, through the network 120, or through a global positioning system. Independent of the method to access the clock signal, the controller 108 processes the clock signal to determine the time of day.

Another condition 604 is that after a certain duration of time has passed, the controller 108 allows entertainment programs to couple to the device. This duration of time may be the amount of time the student should be working on the study materials, and typically can be determined by a counter in the present invention.

In yet another condition 606, the controller 108 allows entertainment programs to couple to the device after the student has achieved a certain level in the study materials. This level can be determined by an evaluator in the study program. The determination can be based on the amount of study materials presented to the student, such as how many screens of materials have been presented to the student. The level can also be set by the number of correct answers the student has provided to the questions asked. With the evaluator having access to the student's answers and the correct answers to the questions presented to the student, the method to determine whether the student has correctly answered the questions should be obvious to those skilled in the art, and will not be further described.

A further example of a condition to remove restriction is through resetting the device or the underlying-system-level codes.

In one embodiment, the removal of restriction is based on a token system. For example, the student can be given a token if certain predetermined condition has been satisfied, such as one of the conditions shown in FIG. 10. The token can be a number of points given to the student, who can enter the token into the controller 108 through the user input device 112. This will allow entertainment programs to be coupled to devices needed to fulfill their entertainment purpose.

In another embodiment, there are many entertainment programs, with their entertainment levels ranked. More entertaining ones require more tokens. The student can accumulate tokens so as to allow an entertainment program with a higher entertainment level to be coupled to the one or more devices it needs to fulfill its entertainment purpose. When the student initiates coupling between an entertainment program and the device, the controller informs the access filter how many tokens the student is giving away, and the number of tokens required by that entertainment program. If there is a match or if the student has more tokens than necessary, coupling will be allowed. Note that the accumulated tokens can be stored in the access storage medium 114, with access requiring the student to input a password.

This disclosure describes different embodiments on programs accessing a device. However, coupling between programs and a device can be initiated by the device to the programs. For example, an entertainment program can register itself with a driver as the sole recipient of data from a device. This registration is done before the restriction as described above is activated. Subsequent to the activation of the restriction, when the device sends data to the driver, the driver checks the credential of the recipient program, or compares the identifier of the recipient program with one or more identifiers in its pre-stored table. Since the program is for entertainment, the driver may restrict coupling between the device and the program. The method to implement such approaches should be obvious to those skilled in the art, and will not be further described.

In the above description, typically only one entertainment program, one study program, one device and one condition are discussed. However, the invention can be extended to many programs, many devices and many conditions. For example, an entertainment program may require more than one device to achieve its entertainment purpose. Another example is that an entertainment program can couple to its corresponding device only if more than one predetermined conditions are satisfied, such as during certain time of day and after the student has achieved a certain level in study materials. A further example is that a number of entertainment programs cannot be simultaneously coupled to a device, while a number of study programs can be simultaneously coupled to the device. In yet another example, a number of entertainment programs and a number of study programs simultaneously try to couple to a device, the present invention can restrict all the entertainment programs from coupling to the device, while allow all the study programs to couple to the device. In the above examples, the computer in the present invention includes multi-processing capability.

Also, the study programs and the entertainment programs disclosed in the present invention can be stored in the storage medium 106, or can be retrieved through the network, or can be generated by one or more other programs.

The present invention describes underlying-system-level codes. In one embodiment, the underlying-system-level codes include an operating system. In another embodiment, the underlying-system-level codes include an object broker. In yet another embodiment, the underlying-system-level codes include a network operating system.

In a further embodiment, the underlying-system-level codes include a browser. In this embodiment, a program can be an applet or a script. When a program intends to couple to a device, the program initially couples to the browser, which identifies the credential of the program to determine if it is an entertainment program or a study program. Examples of methods to identify a credential include identifying the Universal Resource Location of the program, or determining through negotiation using an exchange protocol for the browser to retrieve the program; one type of exchange protocol is the Hypertext Transfer Protocol. In these examples, the browser includes the access filter.

In the present invention, in one embodiment, the device 104 is not limited to a physical device. It can be a logical device, such as a virtual machine or a just-in-time compiler. The logical device can also be a browser plug-in. In another embodiment, for such devices, the access filter includes the virtual driver.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A computer-aided-educational method for educating a student through a computer, which includes a device separated from a plurality of programs by an access filter, with the plurality of programs including a study program and an entertainment program, which requires the device to fulfill its entertainment purpose, the method comprising the steps of:

modifying the access filter to restrict coupling between the device and the entertainment program, but simultaneously allow coupling between the device and the study program; and removing the restriction in the access filter to allow coupling between the device and the entertainment program under a predetermined condition.

2. A computer-aided-educational method as recited in claim 1 wherein the device includes a position-pointing device.

3. A computer-aided-educational method as recited in claim 1 wherein the device includes a speaker.

4. A computer-aided-educational method as recited in claim 1 wherein the device includes a storage medium.

5. A computer-aided-educational method as recited in claim 1 wherein the device includes an output device.

6. A computer-aided-educational method as recited in claim 1 wherein the device includes a circuit board.

7. A computer-aided-educational method as recited in claim 6 wherein the circuit board is a video-signal board.

8. A computer-aided-educational method as recited in claim 7 wherein the video-signal board is for accessing television signals.

9. A computer-aided-educational method as recited in claim 6 wherein the circuit board is an audio-signal board.

10. A computer-aided-educational method as recited in claim 1 wherein the access filter includes a device driver.

11. A computer-aided-educational method as recited in claim 10 wherein:

the device driver is a pre-installed driver; and modifying the access filter to restrict coupling includes the step of invoking another device driver instead of the pre-installed driver.

12. A computer-aided-educational method as recited in claim 10 wherein modifying the access filter to restrict coupling is through invoking an option in the device driver to restrict coupling.

13. A computer-aided-educational method as recited in claim 10 wherein modifying the access filter to restrict coupling is through invoking a restriction-entry point in the device driver.

14. A computer-aided-educational method as recited in claim 10 wherein:

the access filter further includes a virtual driver; and modifying the access filter to restrict coupling is through the virtual driver.

15. A computer-aided-educational method as recited in claim 1 further comprising the step of determining whether a program is a study program or an entertainment program before the step of modifying.

16. A computer-aided-educational method as recited in claim 15 wherein the step of determining includes the step of matching an identifier of the program with one or more identifiers of the one or more entertainment programs stored in the computer.

17. A computer-aided-educational method as recited in claim 16 wherein:

the access filter includes a device driver; and the one or more identifiers of the one or more entertainment programs are stored in the device driver.

18. A computer-aided-educational method as recited in 15 wherein:

each program has its own credential defining whether it is a study program or an entertainment program; and the step of determining includes the step of identifying the credential.

19. A computer-aided-educational method as recited in claim 15 wherein the step of determining includes the step of treating the program as a study program if the student's identifier is in the program's attributes.

20. A computer-aided-educational method as recited in claim 1 wherein the predetermined condition includes the student having achieved a certain predetermined level in the study materials.

21. A computer-aided-educational method as recited in claim 1 wherein:

the computer processes a clock signal; and the predetermined condition includes the time of day as shown by the processed clock signal.

22. A computer-aided-educational method as recited in claim 1 wherein:

the computer includes a counter; and the predetermined condition includes a duration of time that the student should be working on the study materials as shown by the counter.

23. A computer-aided-educational method as recited in claim 1 wherein:

the step of removing the restriction is based on a token system; and the predetermined condition includes whether the student has a token.

24. A computer-aided-educational method as recited in claim 23 wherein:

the plurality of programs include a plurality of entertainment programs;

each entertainment program has an entertainment level; and in order to allow an entertainment program with a higher entertainment level to couple to the device.

25. A computer-aided-educational system for educating a student through a computer, with a plurality of programs, which include a study program and an entertainment program, the system comprising:

a device, which the entertainment program needs to fulfill its entertainment purpose;

an access filter separating the plurality of programs from the device; and a controller modifying the access filter to restrict coupling between the device and the entertainment program, but simultaneously allow coupling between the device and the study program;

such that the controller removes the restriction in the access filter to allow coupling between the device and the entertainment program under a predetermined condition.

26. A computer-aided-educational system as recited in claim 25 wherein the access filter includes a device driver.

27. A computer-aided-educational system as recited in claim 25 wherein the controller also determines whether a program is a study program or an entertainment program.

* * * * *

UNITED STATES PATENT AND TRADEMARK OFFICE
CERTIFICATE OF CORRECTION

PATENT NO. : 5,743,743
DATED : April 28, 1998
INVENTOR(S) : Ho and Tong

It is certified that error appears in the above-indentified patent and that said Letters Patent is hereby corrected as shown below:

Claim 24: Col. 14, line 58:
before "in order to" insert
--the student needs more tokens--.

Signed and Sealed this

Twenty-second Day of June, 1999

Attest:

Q. TODD DICKINSON

*Attesting Officer*      Acting Commissioner of Patents and Trademarks